US012722949B2

(12) United States Patent
Rossato

(10) Patent No.: US 12,722,949 B2
(45) Date of Patent: Sep. 1, 2026

(54) LIFTING BRIDGE, PARTICULARLY FOR MOTOR VEHICLES

(71) Applicant: O.ME.R. S.p.A., Mirano (IT)

(72) Inventor: Orietta Rossato, Mirano (IT)

(73) Assignee: O.ME.R. S.p.A., Mirano (IT)

( * ) Notice: Subject to any disclaimer, the term of this patent is extended or adjusted under 35 U.S.C. 154(b) by 0 days.

(21) Appl. No.: 19/105,908

(22) PCT Filed: Sep. 1, 2023

(86) PCT No.: PCT/IB2023/058655

§ 371 (c)(1),
(2) Date: Feb. 24, 2025

(87) PCT Pub. No.: WO2024/052776

PCT Pub. Date: Mar. 14, 2024

(65) Prior Publication Data

US 2026/0070765 A1 Mar. 12, 2026

(30) Foreign Application Priority Data

Sep. 5, 2022 (IT) ........................ 102022000018129

(51) Int. Cl.
*B66F 7/06* (2006.01)
*B66F 7/08* (2006.01)
*B66F 7/28* (2006.01)

(52) U.S. Cl.
CPC .............. *B66F 7/0691* (2013.01); *B66F 7/08* (2013.01); *B66F 7/28* (2013.01)

(58) Field of Classification Search
None
See application file for complete search history.

(56) References Cited

U.S. PATENT DOCUMENTS 4,848,732 A 7/1989 Rossato
4,886,145 A 12/1989 Iwahashi
(Continued)

FOREIGN PATENT DOCUMENTS

CH 639350 B2 11/1983
CN 102630212 A * 8/2012 ............. B66F 7/065
(Continued)

OTHER PUBLICATIONS

International Search Report From PCT/IB2023/058655.

*Primary Examiner* — Diem M Tran
(74) *Attorney, Agent, or Firm* — Carmel Patent Agency; Robert Ballarini

(57) ABSTRACT

A lift includes: at least one lane, two legs articulated to the lane, each made of a single arm, an actuator associated with each leg and configured to vary the leg's inclination with respect to the horizontal plane and to lift and lower the lane, and a synchronized control unit of the actuator. The two legs articulated to lane are arranged symmetrically with respect to a transversal median plane of the lift. The lower end of each leg is articulated to a base for anchoring to a floor. The upper end of each leg is articulated to the respective lane in correspondence with a transverse axis to a carriage sliding along the lane. The carriages are connected to each other by a pair of flexible traction elements, each connected with its ends to the two carriages and is returned by a respective transmission member mounted idly on the lane.

19 Claims, 6 Drawing Sheets

(56) References Cited

U.S. PATENT DOCUMENTS

| | | | |
|---|---|---|---|
| 5,016,858 | A | 5/1991 | Mitchell |
| 5,450,928 | A | 9/1995 | Isogai |
| 6,213,451 | B1 | 4/2001 | Finkbeiner |
| 6,443,429 | B1 | 9/2002 | Hawk |
| 8,286,944 | B2 | 10/2012 | Rossato |
| 2002/0003998 | A1 | 1/2002 | Gotz |
| 2003/0006099 | A1 | 1/2003 | Boucher |
| 2009/0020736 | A1 | 1/2009 | Rossato |
| 2022/0135383 | A1 | 5/2022 | de Jong |

FOREIGN PATENT DOCUMENTS

| | | | | | |
|---|---|---|---|---|---|
| CN | 106241657 | B | | 5/2018 | |
| DE | 102016122036 | A1 | * | 6/2017 | ............ B66F 7/0691 |
| EP | 2719653 | A1 | * | 4/2014 | ............ B66F 7/0691 |
| EP | 3138807 | A1 | * | 3/2017 | ............ B66F 7/0691 |
| EP | 3995437 | A1 | | 5/2022 | |
| FR | 2823735 | A1 | * | 10/2002 | ................ B66F 7/28 |
| IT | BO20110090 | A1 | * | 2/2011 | |
| WO | 8911438 | A1 | | 11/1989 | |

* cited by examiner

FIG. 2
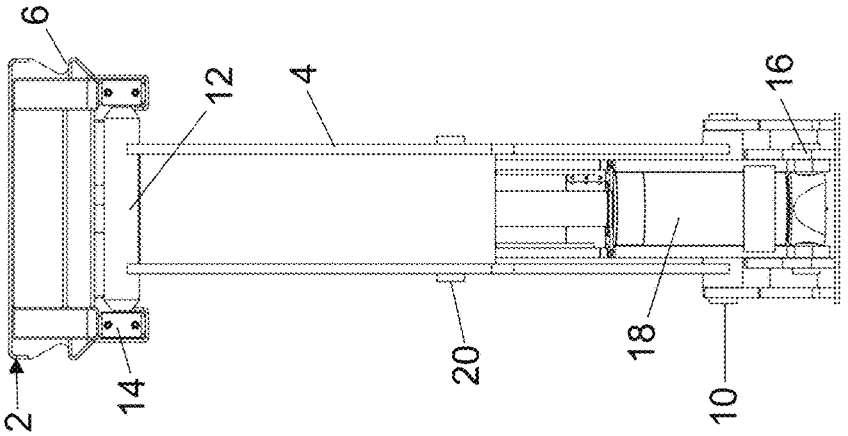
FIG. 1
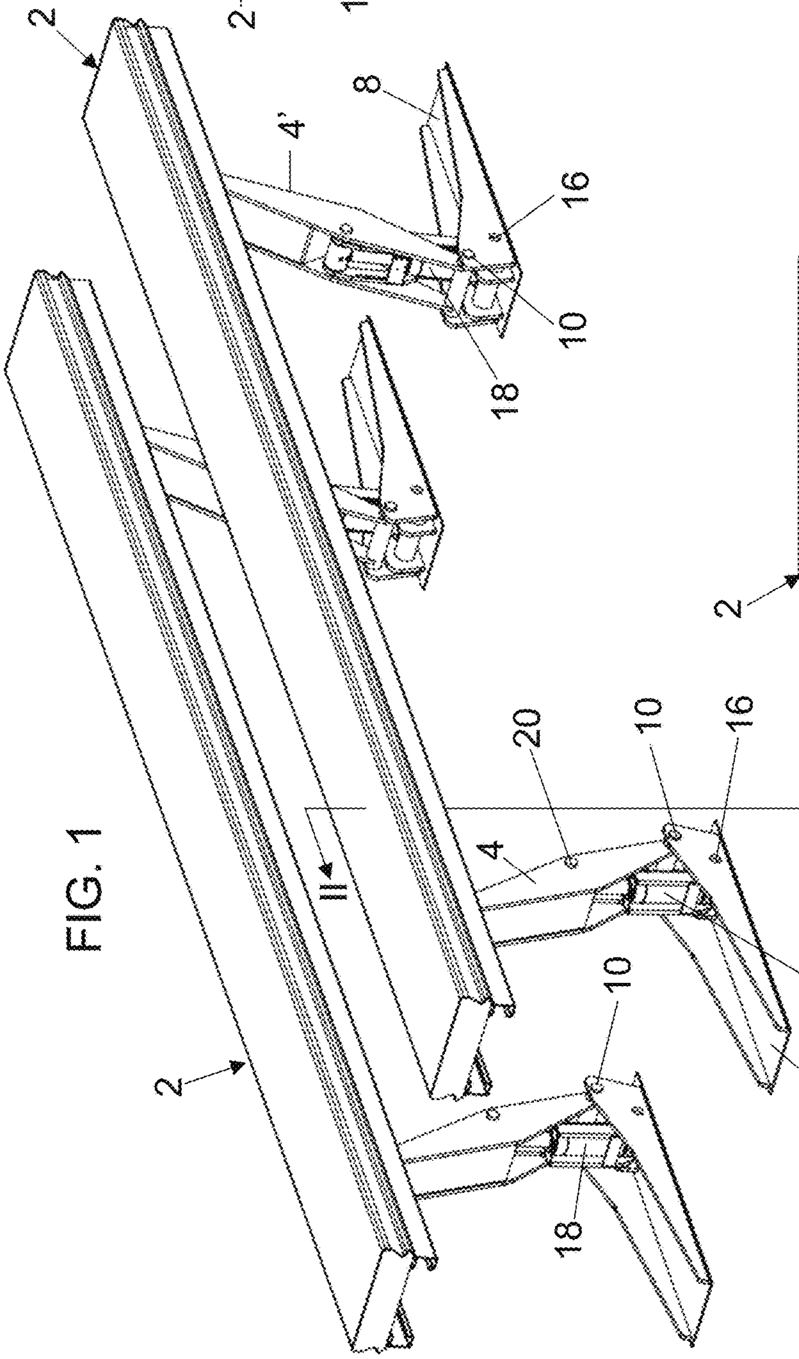
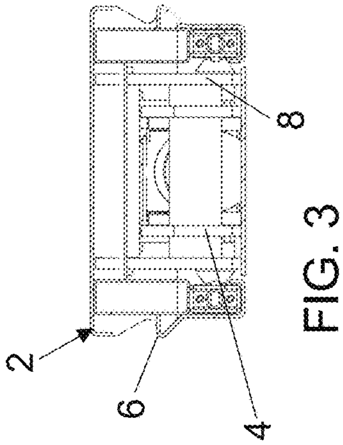
FIG. 3

LIFTING BRIDGE, PARTICULARLY FOR MOTOR VEHICLES

CROSS-REFERENCE TO RELATED APPLICATIONS

This application is a § 371 National Phase of PCT/IB2023/058655, filed Sep. 1, 2023, which claims priority to Italian Patent Application No. 102022000018129, filed Sep. 5, 2022, the entire contents of all of which are incorporated by reference herein as if fully set forth.

INVENTIVE FIELD

The present invention concerns a lift for motor vehicles.

BACKGROUND

Lifts for motor vehicles are known, comprising a pair of lanes, onto which the motor vehicle to be lifted is raised, and two articulated legs above each lane and below a base, which can be constituted by a spar anchored or resting on the floor. or it can be made up of the same floor suitably configured and reinforced to support said legs in an articulated manner.

Each leg can be made up of a single rigid element or arm, articulated below the base and above a lane, or by several rigid elements or arms, articulated together and also articulated below the base and above a rail.

The up and down movement of the two lanes is generally obtained with hydraulic actuators, placed between the legs and the lanes or between the legs and the base or between the articulated arms that form each leg.

A hydraulic power unit connected to the actuators introduces the oil into them and discharges it from them and thus causes the synchronized upward and downward movement of the lanes with respect to the base.

There are various types of lifts: one of these, called "parallelogram" is described for example in U.S. Pat. No. 4,848,732. It includes two base spars anchored or resting on the floor, two lifts with respect to the base spars and two or more pairs of legs, each made of a single element articulated below a base spar and above the corresponding lane.

In these lifts, the lifting of the lanes with respect to the spars is obtained with actuators placed between two homologous legs and the respective lanes. With the lengthening and shortening of the actuators following the introduction into them or the discharge from them of the hydraulic fluid, the angle formed between each leg and the lane, between which each actuator is placed, varies, and this determines the deformation of the parallelogram formed by each spar, the corresponding lane and the two legs articulated to both and, consequently, the substantially translational movement of the lanes with a vertical component.

In lifts of this type the curve that represents the trend of the pressure of the hydraulic fluid in the actuators as a function of the lifting stroke of the lanes is decreasing, in the sense that the greater the height reached by the lanes, the lower the pressure of the fluid hydraulic system that keeps them raised and this is advantageous as the stresses on the actuators and on the mechanical safety locking devices of the raised lift are lower than those required when lifting the lift.

This type of lift has found widespread diffusion due to its simplicity of construction and its operational reliability, but at the same time it has also highlighted some drawbacks, in particular:

- a horizontal component of movement of the lanes during their lifting and the consequent overall dimensions of the raised lift significantly greater than that of the lowered lift, with the need to have a room larger than those required by lifts for the installation of the lift, in which the lanes move with essentially vertical motion;
- the space occupied by the spars on the ground, which hinders the free passage of operators underneath the raised lift; this inconvenience can be overcome by eliminating the side members and with the direct articulation of the legs to the floor, which however in this case requires being prepared for this installation, for example by creating a concrete beam embedded in the floor for the structural connection of the legs;
- a limited maximum height that can be reached from the lanes due to the monolithic nature of the legs, which cannot be excessively long unless at the cost of negative structural and operational implications of the lift,
- a hyperstatic behavior as each lifting jack is placed between a leg and the lane, which in practice has four or more constraint points.

Another known typology of lifts, described for example in U.S. Pat. No. 8,286,944, is characterized by having each leg formed by two arms of substantially equal length, articulated at one end to each other and at the other end to a base and the lane respectively corresponding. In these known lifts, in which the lanes move with substantially vertical motion, the hydraulic actuators for lifting the lanes are placed between the two arms of each leg, which moreover requires that these two arms are assisted by other articulated arms, having the function of making the leg-lane complex stable and of creating further support for the lanes, which in practice are supported by four points, i.e. two points for each leg.

In these known lifts, the positioning of the bases, to which the legs are articulated, requires high accuracy in order to allow the complete lifting of the lift and its complete lowering.

Furthermore, the support of each lane on four points implies a hyperstatic constraint, which in the case of deformation of the lanes or simply in the case of different heights reached by them as a result of imbalances in the load or imbalances generated by the synchronization system of the actuators. causes hyperstatic forces to arise, which involve efforts linked to the constraints and deformations of the lift structure and only partially reduced by the elastic compensation system of the legs.

Another drawback consists in that the curve which represents the trend of the pressure of the hydraulic fluid feeding the actuators as a function of the lifting stroke of the lanes is firstly decreasing until it reaches a minimum value, after which it begins to rise again until it practically reaches the high starting value when the lift is fully raised. This implies that the stresses on the actuators and on the mechanical safety locking devices of the lifted lift are maximum when the lift is lifted, i.e. it is in effective working conditions.

Other drawbacks of this known type of lift consist in a high manufacturing complexity, linked to the large number of components, which must necessarily be connected to each other and inevitably involve play and imprecision in their reciprocal movements.

Also known from EP 3995437 are lifts for motor vehicles comprising a pair of lanes each supported by a pair of legs symmetrically placed with respect to the transversal center plane of the lift lift. Each leg comprises a main rigid arm, which is articulated at the bottom to a base in correspondence with a first fixed transverse axis and at the top is articulated to a lane in correspondence with a second transversal axis sliding longitudinally along this. Each leg also includes an auxiliary arm articulated above the lane in correspondence with a third fixed transverse axis and articulated below the main arm in correspondence with a fourth fixed transverse axis, having the same distance from the second and third transverse axis. Each actuator for lifting the lift is placed between the third transverse axis and a fifth transverse axis distinct from the fourth axis and fixed with respect to the main arm.

Drawbacks of this well-known lift consist in the hyperstatic connection of the lift lanes to the legs and in the large size of the legs along their length. Furthermore, these lifts also present other drawbacks already described in relation to the lift according to U.S. Pat. No. 8,286,944.

Finally, other lifts are also known with legs made up of two or more elements linked together with articulation systems which involve a non-vertical movement of the lanes and often a non-symmetrical arrangement of the legs with respect to the lanes, with reference to a transversal median plane of each lane; and this asymmetry in turn determines an asymmetric behavior of the lanes with respect to the load.

OBJECTIVES

The present invention aims to create a lift for motor vehicles which substantially eliminates all the drawbacks recognizable in the known types of lifts, whilst retaining the relevant advantageous aspects.

More specifically, an object of the invention is to create a lift in which the movement of the lanes occurs in a substantially vertical direction.

Another purpose of the invention is to create a lift, in which each leg is made of a single element articulated below the base and above a lane of the lift, and therefore presents a limited manufacturing complexity.

Another object of the invention is to create a lift capable of reaching a maximum height of the lanes equal to that reachable by current lifts which use legs formed by a single arm but have a greater overall length.

Another object of the invention is to create a lift capable of reaching a maximum height of the lanes equal to that reached by current lifts which use legs formed by several articulated arms.

Another object of the invention is to provide a lift, in which the support of the rails to the legs is of the isostatic type, with the elimination of stresses linked to the constraints and deformations of the lift structure.

Another purpose of the invention is to create a lift that does not impede the free passage of operators underneath the raised lift.

Another purpose of the invention is to create a lift that has dissipative behavior in the event of seismic events.

Another purpose of the invention is to create a lift capable of reducing the deformations and structural stresses that arise on the lanes as the lift is raised.

SUMMARY

All these purposes and others that will result from the following description are achieved jointly or separately according to the invention with a lift for motor vehicles as defined below.

BRIEF DESCRIPTION OF THE DRAWINGS

The present invention is further clarified below in some of its preferred practical embodiments reported for purely illustrative and non-limiting purposes with reference to the attached drawings, in which:

FIG. 1 schematically shows a perspective view of a lift according to the invention in a raised condition, FIG. 2 shows it according to the enlarged vertical section II-II of FIG. 1, FIG. 3 shows it in the same view as FIG. 2 but in lowered condition.

DETAILED DESCRIPTION OF THE PREFERRED EMBODIMENTS

Figure 4:
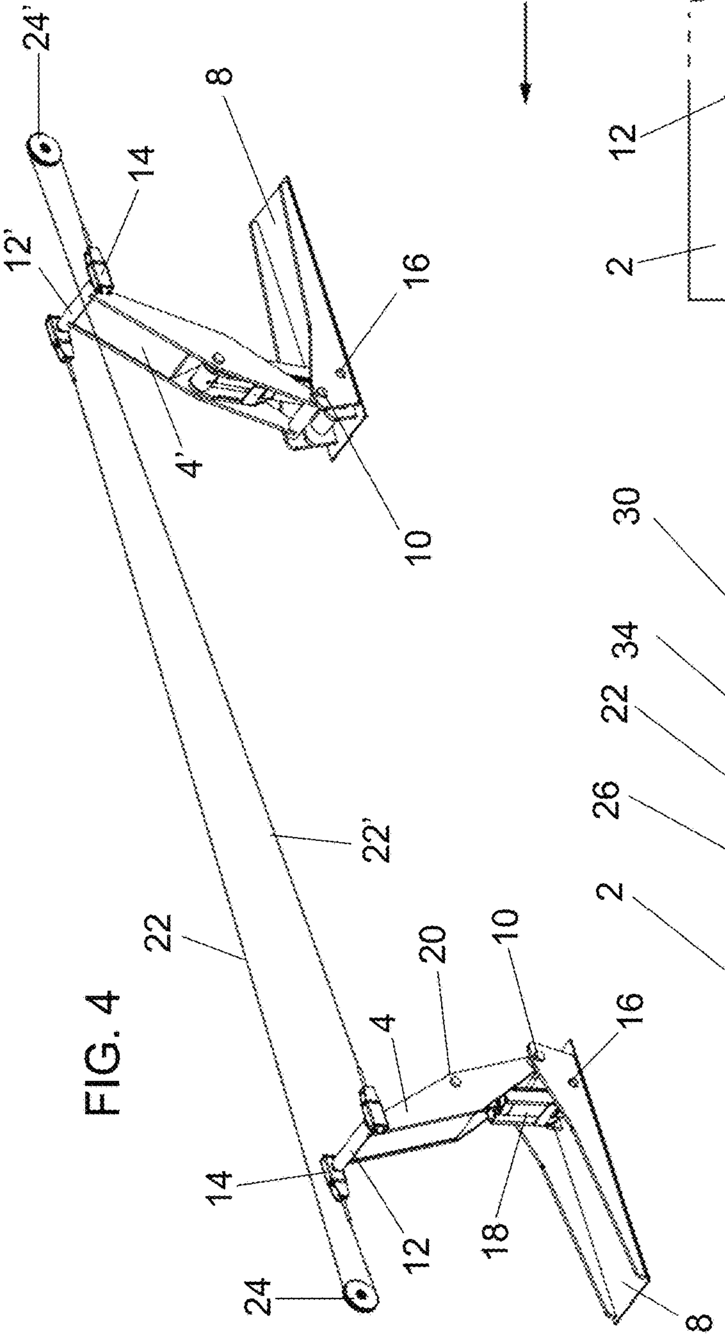
FIG. 4 is a perspective view and in a first embodiment of a longitudinal half of the lift without an upper lane and in the condition of the lift raised, FIG. 5 schematically shows the effect of the operating principle of the lift according to the invention.

As can be seen in the figures, the lift according to the invention includes two lanes 2, intended to accommodate a motor vehicle or in any case the load to be lifted, and two pairs of legs 4,4', for the articulated support of the two lanes. Each leg is made up of a single element configured and sized based on the specific stresses resulting from the project. Preferably each leg 4,4' is made up of sheet metal plates of suitable shape and thickness, welded together so as to define a box-like element capable of effectively resisting the flexural and torsional stresses typical of lift lifts, in particular when they are stressed by eccentric loads, which can arise when the lifts are equipped with auxiliary crosspieces connecting the lanes, weighing mainly on the internal edge of the same. Indeed, for this purpose it can be advantageously provided that the lanes 2 have a profile such as to highlight a continuous longitudinal step 6 (see FIGS. 2,3), useful for supporting these auxiliary crosspieces (not shown as they are traditional), which they are often requested to facilitate the work of the operators on the vehicle placed on the lanes of the raised lift.

Each leg 4,4' is articulated below to a base 8, preferably anchored to the floor, and is articulated above the corresponding lane 2. However, while the lower articulation of each leg 4,4' to the relevant base 8 occurs at a fixed transverse axis 10, the upper articulation of each leg 4,4' to the relevant lane 2 occurs in correspondence with a carriage 14, which in the present embodiment includes a rigid crosspiece 12,12', fixed to the upper end of the leg itself and provided at the ends with blocks for sliding along the lane 2, preferably within longitudinal guides obtained in this.

Also articulated to each base 8, in correspondence with a fixed transverse axis 16, distinct from the axis 10, is an actuator 18, preferably of the hydraulic type, which is constituted by a jack, having the stem articulated to the respective leg 4,4' in correspondence with a transverse axis 20, preferably located approximately in the central area of the leg itself. The two actuators 18 applied to the two legs 4,4' are connected to a power supply and control unit (not shown) and are synchronized with each other in their movements with flow dividers or with electronic systems, which in themselves are traditional and not are further described. However, it is envisaged that not one but two side-by-side actuators can be applied to the same leg 4,4', obviously synchronized in their movements.

In a first embodiment illustrated in FIG. 4, the end of a metal rope 22,22' is fixed to each trolley 14, which with the other end is fixed to the other trolley 14. The two ropes 22,22' are returned by respective idle pulleys 24,24' with a horizontal axis, connected to the lane 2 in positions external to the two legs 4,4', preferably to corresponding side walls of the lane itself.

In this way the set of the two metal cables 22,22' and the two trolleys 14, to which they are fixed, constitutes a sort of closed ring, wrapped around the two pulleys 24,24' and establishes a further connection between lanes 2 and legs 4,4', designed to control, as will be better seen later, the sliding of the lanes with respect to the legs in the case of different inclinations of the legs themselves.

Given their function, the two wire ropes 22, 22' could be replaced by chains or belts or other substantially inextensible flexible traction elements.

The shape and dimensions of the legs 4,4' of the lanes 2 and of the bases 8 are preferably such that when each lane 2 is in its lowest position, in practice resting on the floor, it houses the bases 6 inside it, the legs 4,4' and the actuators 18, as can be seen from the comparison between FIG. 2 and FIG. 3.

In this lowered condition, the articulation axis 10 of each leg 4,4' at the relative base 8 is preferably at a higher level than the articulation axis 16 of the corresponding actuator 18 at the base itself and also higher than the axis of articulation 12,12' of each leg 4,4' to the respective lane 2. Since in practice this last articulation axis coincides with the axis of the crosspiece 12,12', in the present description the crosspiece 12,12' of each trolley 14 and the articulation axis of the leg 4,4' to lane 2 are identified with the same numerical references.

Furthermore, always when each lane is in the most lowered position, the articulation axis 20 of each actuator 18 to the relevant leg 4,4' is preferably at a higher level than the articulation axis 16 of the actuator itself at the base 8.

The operation of the lift according to the invention can be better understood if we first distinguish the case of the lift loaded with a motor vehicle in a balanced manner and the case of the lift loaded with a motor vehicle in an unbalanced manner, for example with the front part of the motor vehicle heavier than the rear.

In the ideal case of a perfectly balanced load and a synchronization system of the lift lifting actuators 18 without tolerances, during the lifting of the lift the lanes 2 move with a purely vertical translational motion and remain perfectly centered in the longitudinal direction with respect to the legs 4,4'.

In practical cases, however, the load is almost always unbalanced and the synchronization system of the actuators 18 always presents inevitable intervention tolerances. If in these conditions the lanes 2 were simply connected to the legs 4,4' in correspondence with the trolleys 14, the inevitable greater deformation of the most loaded leg and its different inclination with respect to the other leg would cause during the ascent and descent of the lift the uncontrolled sliding of each lane 2 with respect to its legs 4,4' to the extent permitted by the degrees of freedom of the system and in a direction consistent with the movement of the upper end of the leg 4 or 4', which at that moment presents a greater friction with lane 2, regardless of the greater or lesser load placed on that leg.

However, the presence of this further constraint between each lane 2 and the respective legs 4,4' via the ropes 22,22' and the pulleys 24,24' means that if for example due to an imbalance in the load one of its legs 4 or 4' of each lane 2 is less inclined than the other leg, a control is carried out on the longitudinal sliding of lane 2, in the sense that this sliding always occurs towards the least inclined leg 4 or 4' and is of an amount equal to half of the difference between the runs made by the sleepers 12,12' along lane 2, to which the leg itself is tied.

Figure 5:
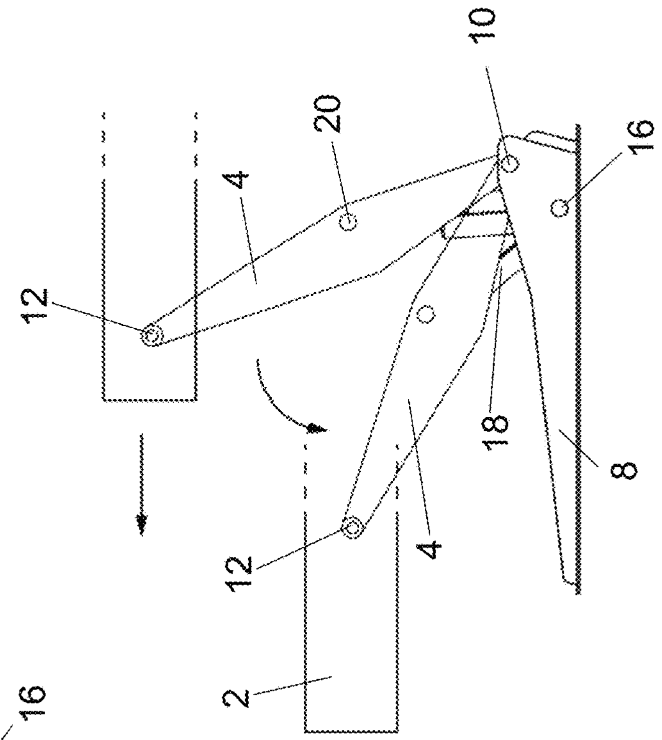

The FIG. 5 schematically illustrates the operating principle of the lift according to the invention now described: in it is seen that in the hypothesis in which a leg 4 of the lift is for example more heavily loaded than the leg 4' of the same lane 2, the smaller inclination of this leg 4 with respect to the horizontal results in a sliding of each lane 2 with respect to the upper end of the leg 4 less inclined until the transversal center plane of the lane itself returns to a position equidistant from the crosspieces 12,12'.

In this way it is possible to obtain a series of advantages with a rather simple lift configuration with safe and reliable operation, which previously was not possible to obtain with traditional lifts.

One of the advantages consists in the possibility of controlling the movements of each lane 2 of the lift with respect to its legs 4,4' according to a defined motion law as a function of the different inclination of the latter with respect to the horizontal.

Another advantage consists in the fact that the support of each lane 4,4' on the legs 2 occurs at only two points and therefore constitutes an isostatic constraint which excludes the onset of stresses linked to constraints and deformations of the structure.

Another advantage consists in the fact that the arrangement of the legs 4,4' with respect to the lanes 2 means that the two supports of each lane 2 on the two legs 4,4' become increasingly closer to each other as the lift rises and this reduces the inevitable bending deformations of the lanes under load in the raised lift condition.

Another advantage consists in the fact that the curve representing the trend of the pressure of the hydraulic fluid in the actuators 18 as a function of the lifting stroke of the lanes 2 is decreasing, with all the beneficial effects in terms of stresses on the actuators 18 and on the control devices. mechanical safety of the raised lift, always present.

Another advantage is the absence of obstacles for operators underneath the raised lift.

Another advantage consists in the fact that in the case of seismic events the energy imparted to the lift is partially dissipated by the friction generated in the relative movement between lane 2 and legs 4,4' thanks to the further substantially elastic connection between them via the ropes 22,22' and the pulleys 24,24'.

Another advantage consists in the fact that the greater height of the articulation axis 10 of the legs 4,4' at the respective bases 8 compared to the articulation axis 12 of the legs themselves at the lanes 2 when the lift is lowered allows the use of the 'entire length of the legs 4,4'' and therefore to use legs of shorter length with the same overall dimensions of the lowered lift and with the same maximum height reachable from the lanes 2. In particular, with the lift according to the invention it is possible to obtain a ratio between the vertical lifting stroke of the lanes 2 and the length of the legs 4,4' (measured with reference to the articulation axes 10 and 12) close to or even greater than unity, unlike traditional lifts, in which this value is clearly less than unity, both if they have legs made up of a single arm and if they have legs made up of articulated arms and the length of the leg is considered to be the sum of the lengths of the two arms that form it.

It should be noted that the differences in load which affect the support points of the lanes 2 on the legs 4,4' when the lift is raised and which are generally due to various causes, such as in particular the non-uniform distribution of the weights in the raised motor vehicle, the differences in behavior of the safety devices, the hydraulic power supply tolerances, the pressure differences on the various jacks and the consequent differences in their elongation, the power supply tolerances, would tend to alter the geometry of the lift and arrange it in a different way its two lanes 2, in contrast with the reaction of the motor vehicle which is placed on them in a braking condition and which tends with its presence to prevent relative movements between them according to the axis of the lanes.

If this tendency to alter the geometry of the lift remains below a certain extent, linked to the construction characteristics of the lift, it can be absorbed by the contact between the tires of the vehicle and the lanes, by the deformability and by the plays of the lift itself, as well as by the elasticity of the ropes 22,22'. Since in practice this tendency can go beyond the absorption capacity of the deformability and play of the lift itself and the elasticity of the ropes, the invention envisages overcoming it by mounting each pulley 24,24' on a cushioned support and more particularly on a pin 26 in turn mounted on a trolley 28 equipped with a rod 30 sliding axially within a bracket 32 fixed to the lane 2, so as to allow movements of the trolley itself along it. A pre-compressed spring 34 is placed between the carriage 28 and the bracket 32, which keeps the rope 22,22' taut while yielding elastically if it is subjected to traction of a magnitude greater than a predetermined value.

Figure 6:
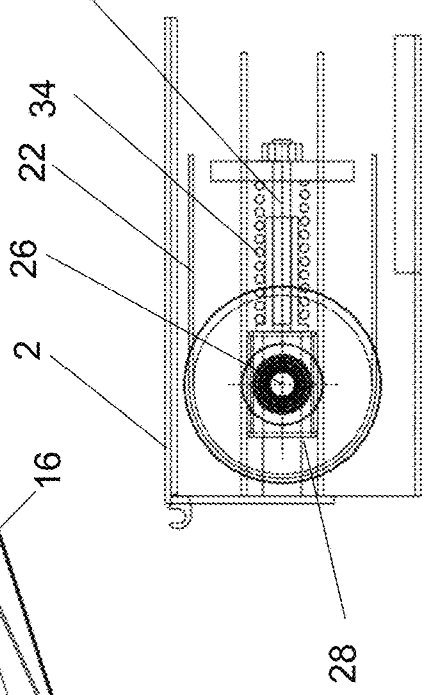
FIG. 6 shows the detail of the constraint of a pulley to a single lane via a cushioned support.

A cushioned pulley 24 with its support carriage 28 is shown schematically in FIG. 6.

Figure 7:
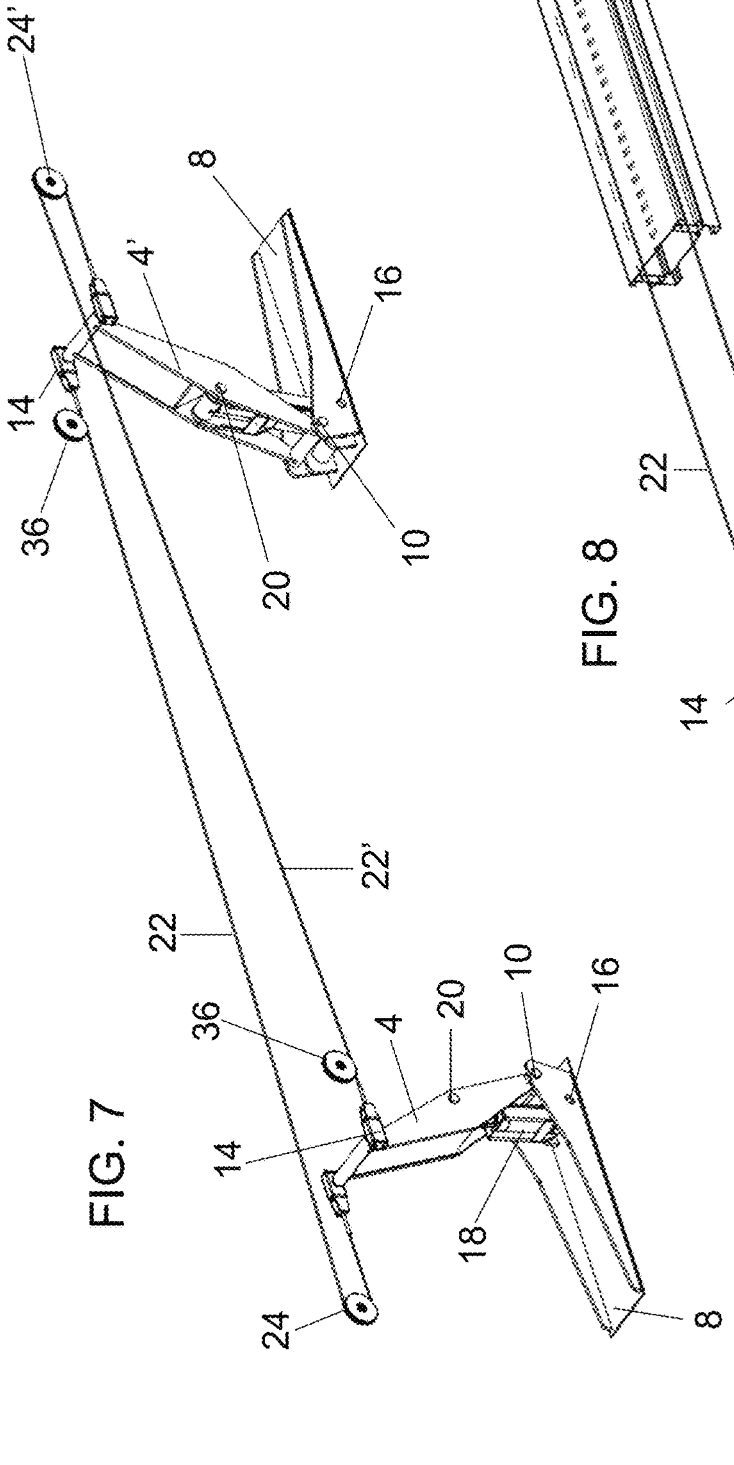
FIG. 7 shows in the same view as FIG. 4 in a second embodiment a longitudinal half of the lift without an upper lane and in a raised lift condition.

In FIG. 7 schematically illustrates a second embodiment, which differs from the previous one due to the presence of further pulleys 36 or similar deflection members, also mounted idle on the lanes 2 and having the function of deflecting the straight sections of the cables 22,22' so to modify their course to make them parallel to lanes 2 in a stretch.

Figure 8:
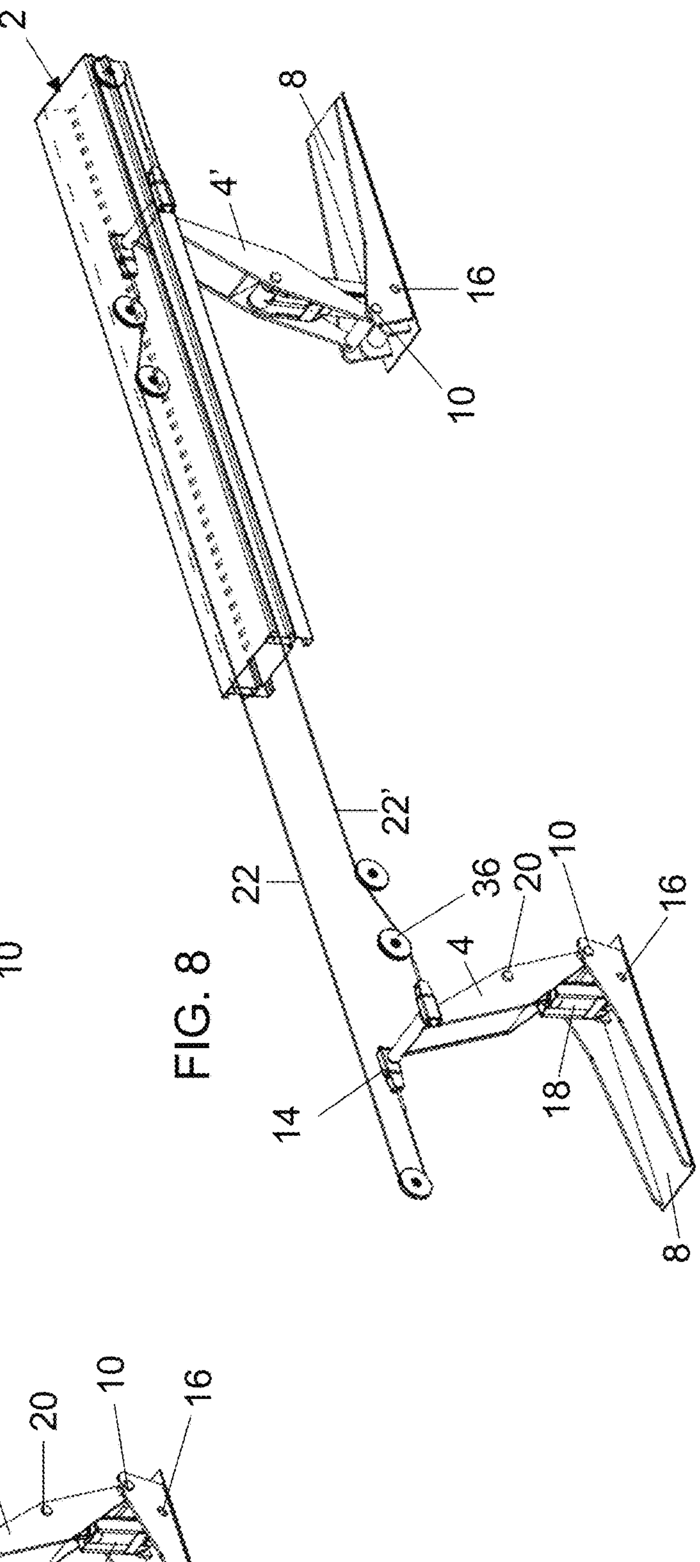
FIG. 8 shows it in the same view as FIG. 4 in a third embodiment.

This second embodiment on the one hand presents greater manufacturing complexity due to the need to have these additional diverter pulleys 36, but on the other hand ensures a more precise control of the movements of the lanes 2 with respect to the legs 4,4' thanks to the substantial parallelism with the upper surface of the lanes 2 of the cable sections 22,22' included between the deflector pulleys 36 and the trolleys 14. If you then want all the straight sections of the two cables 22,22' to be parallel to the upper surface of the lanes, pairs of deviating pulleys 36 can be provided, as illustrated in the third embodiment illustrated in FIG. 8.

Figure 9:
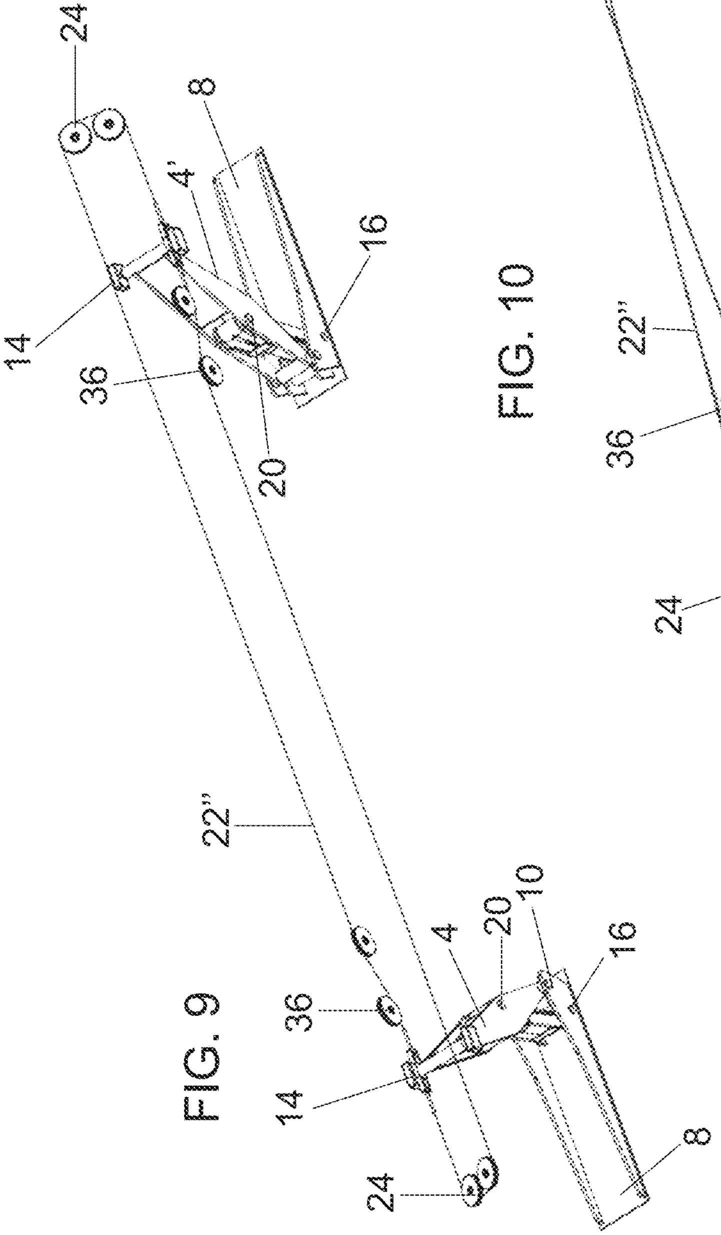
FIG. 9 shows it in the same view as FIG. 4 in a fourth embodiment.

In a fourth embodiment, illustrated in FIG. 9, the lifting lift is provided with a single 22" rope closed in a ring, fixed in two points diametrically opposite to the trolleys 14 and sent externally to the two legs 4,4' by pulleys 24,24' which in addition to defining the distance between the two straight sections of the 22" rope corresponding to the width of the trolleys 14 are also placed at different levels so as not to interfere with the movements of the trolleys themselves. This can be achieved with two pairs of 24,24' pulleys placed in the two return areas of the 22" rope on inclined planes in the opposite direction compared to the upper plane of lane 2 and sized so as to correctly define the distance between the two straight sections of this, and with two pairs of deviating pulleys 36 placed on each longitudinal side of the ring formed by the rope itself; or it can be obtained with a pair of pulleys (not shown) with a diameter equal to the distance between these straight sections and arranged on opposing inclined planes in the two return zones of the 22" rope.

Figure 10:
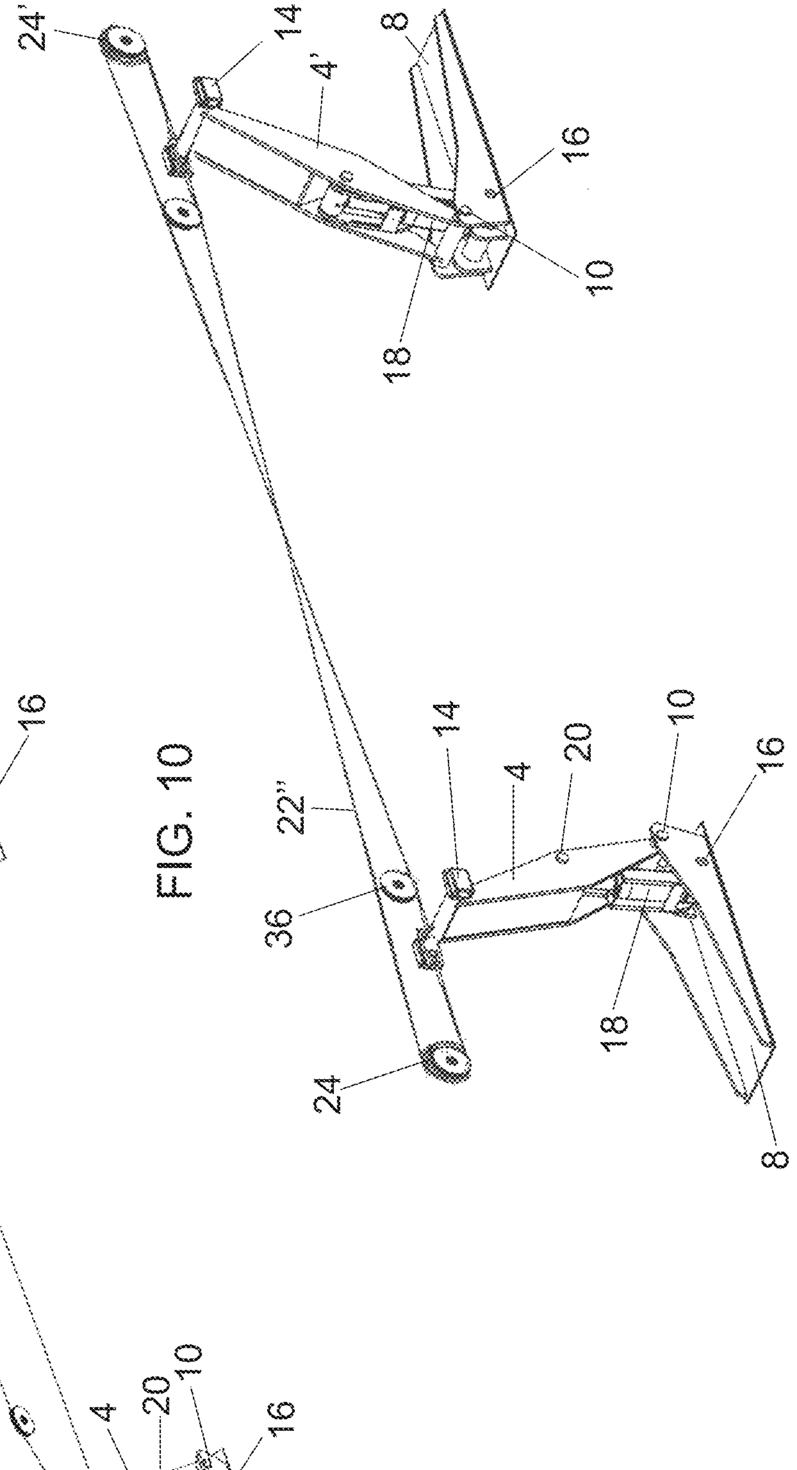
FIG. 10 shows it in the same view as FIG. 4 in a fifth embodiment.

The fifth embodiment illustrated in FIG. 10 always involves the use of a single 2" cable, which is placed entirely on one side of lane 2. This embodiment allows both the reduction of the number of deviating pulleys 24,24',36, as can be seen from a comparison between FIG. 9 and FIG. 10, and to reduce the size of the 22" rope and the 24,24' pulleys inside lane 2. In turn, this size reduction allows each 4,4' leg to be made asymmetrical with respect to the longitudinal plane of lane 2, with reduction of the torsional moment on the same in the case of use of lifting beams placed between the lanes.

In this fifth embodiment it is preferable that the deflector pulleys 36 and/or the deflection pulleys 24,24' are mounted on the lanes 2 with the respective rotation axes not parallel to each other, but slightly inclined in the opposite direction, in order to keep the two sections of the single 22" rope in the central area of the lane slightly distanced from each other and avoid unwanted interference between them.

Figure 11:
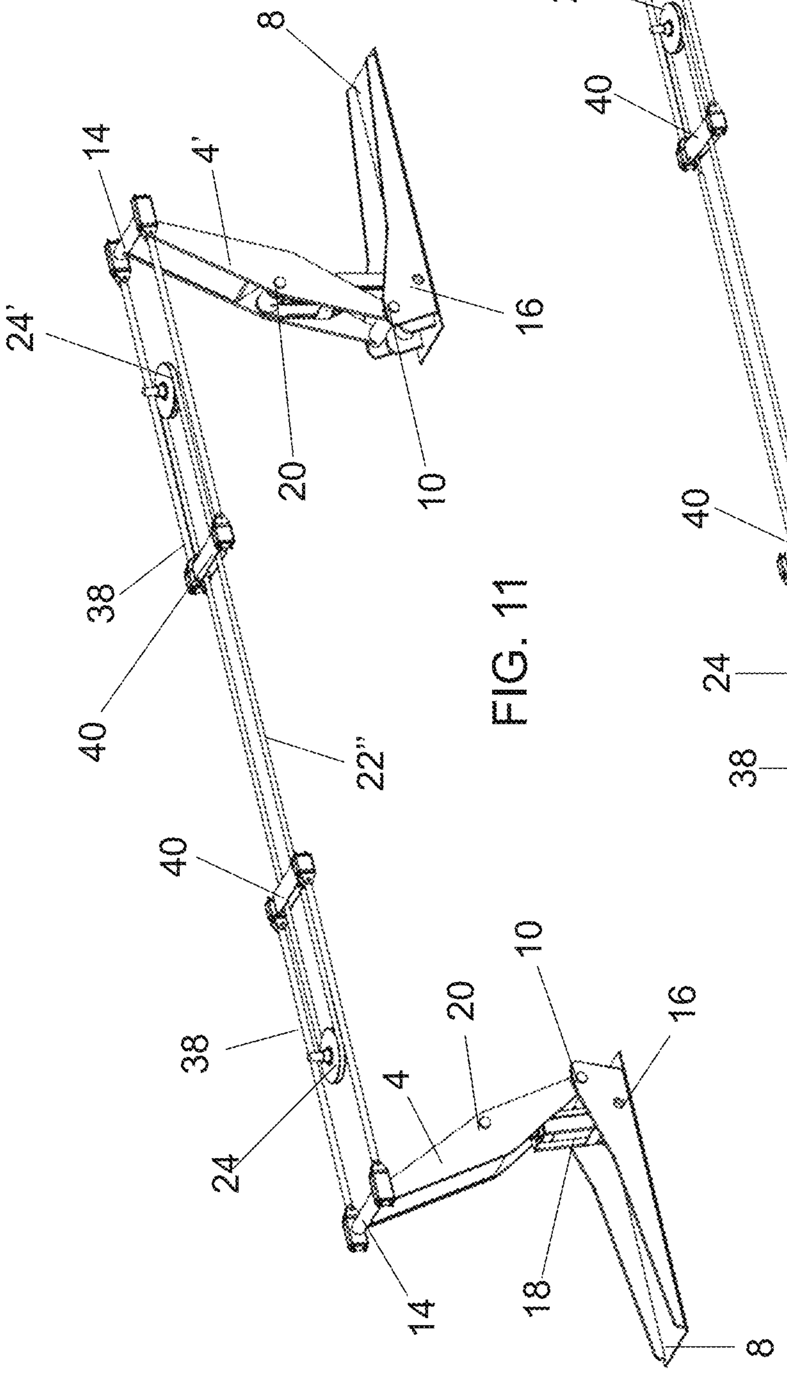
FIG. 11 shows it in the same view as FIG. 4 in a sixth embodiment.

In a sixth embodiment, illustrated in FIG. 11, a pair of rods 38 are attached to the carriage 14 associated with each leg 4,4', which are housed within respective longitudinal guiding cavities obtained in the corresponding lane 2 and extend towards the other leg 4',4 articulated to the lane 2.

The two rods 38 connected to each leg 4,4' are also connected, with their other end, to a respective trolley 40, configured to slide along the central section of the lane 2, i.e., along a section of the lane internal to the trolleys 14.

Each trolley 40 is tied to one of the two straight sections of a single 22" metal cable, closed in a ring around two equal pulleys 24,24' with a vertical axis, mounted idly on lane 2 externally to the two trolleys 40 but internally to the two trolleys 14. In this way the two trolleys 40 are connected to each other in the sense that they are forced to move simultaneously in opposite directions along the lane 2. Thanks then to the connection between the trolleys 40 and the trolleys 14 via the rods 38, it is also carried out in this case the controlled longitudinal movement of lane 2 as the inclination of the legs varies 4,4'

Obviously the single 22" rope could be replaced by two ropes tied at both ends to the two trolleys 40 after having been returned by the two pulleys 24,24'.

This sixth embodiment has the important advantage of occupying a limited space below the lanes 2 and of ensuring easy access for maintenance of the ropes and pulleys.

In all the embodiments now described, the distance between the lower ends of the two legs 4,4' is always smaller than the distance between the upper ends of the legs themselves.

Figure 12:
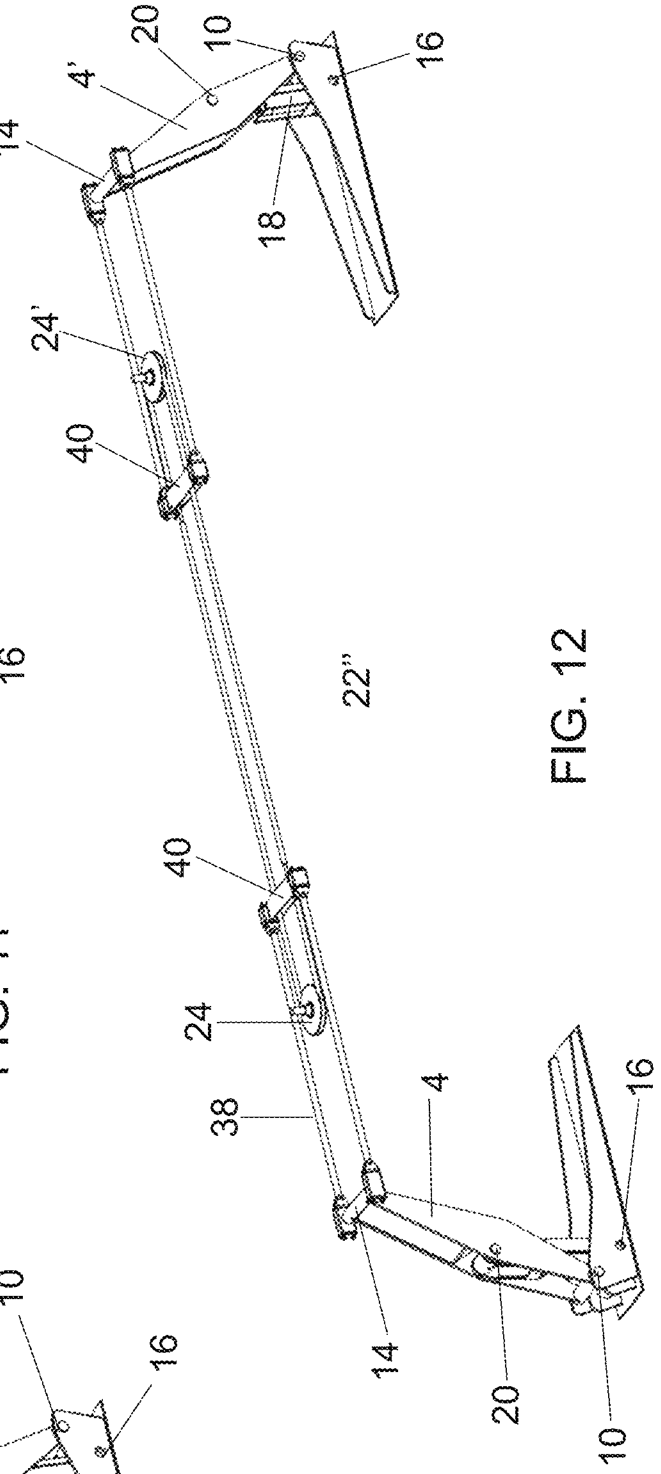
FIG. 12 shows it in the same view as FIG. 4 in a seventh embodiment.

A seventh embodiment illustrated in FIG. 12 is always based on the same principle of having the lanes 2 resting on the two legs 4,4' at two points (isostatic support) and of having a controlled longitudinal sliding movement of each lane 2 with respect to the upper end of the legs 4,4' but differs from the previous ones in having the distance between the lower ends of the two legs 4,4' always greater than the distance between the upper ends of the legs themselves. In this case, however, the controlled longitudinal sliding of lane 2 always occurs towards the leg 4 or 4' most inclined with respect to the horizontal.

This seventh embodiment has the further advantage compared to the previous one of requiring two 22,22' ropes (or a single 22" rope closed in a ring) of shorter length and therefore less extensibility in the stressed condition, but at the same time presents the disadvantage of having the lanes 2 much more loaded in the raised lift condition and of requiring greater pressure of the hydraulic fluid in the initial phase of lifting the lift, given the greater length of the cantilevered portions of the lanes.

Even if the FIG. 12 illustrates this seventh embodiment which uses the same connection methods between the legs 4,4' described in relation to the sixth embodiment illustrated in FIG. 11, it is understood that all the other embodiments previously described can also have the upper ends of the legs 4,4' closer together than the lower ends, evidently with all the advantages and disadvantages that these different embodiments entail.

Figure 13:
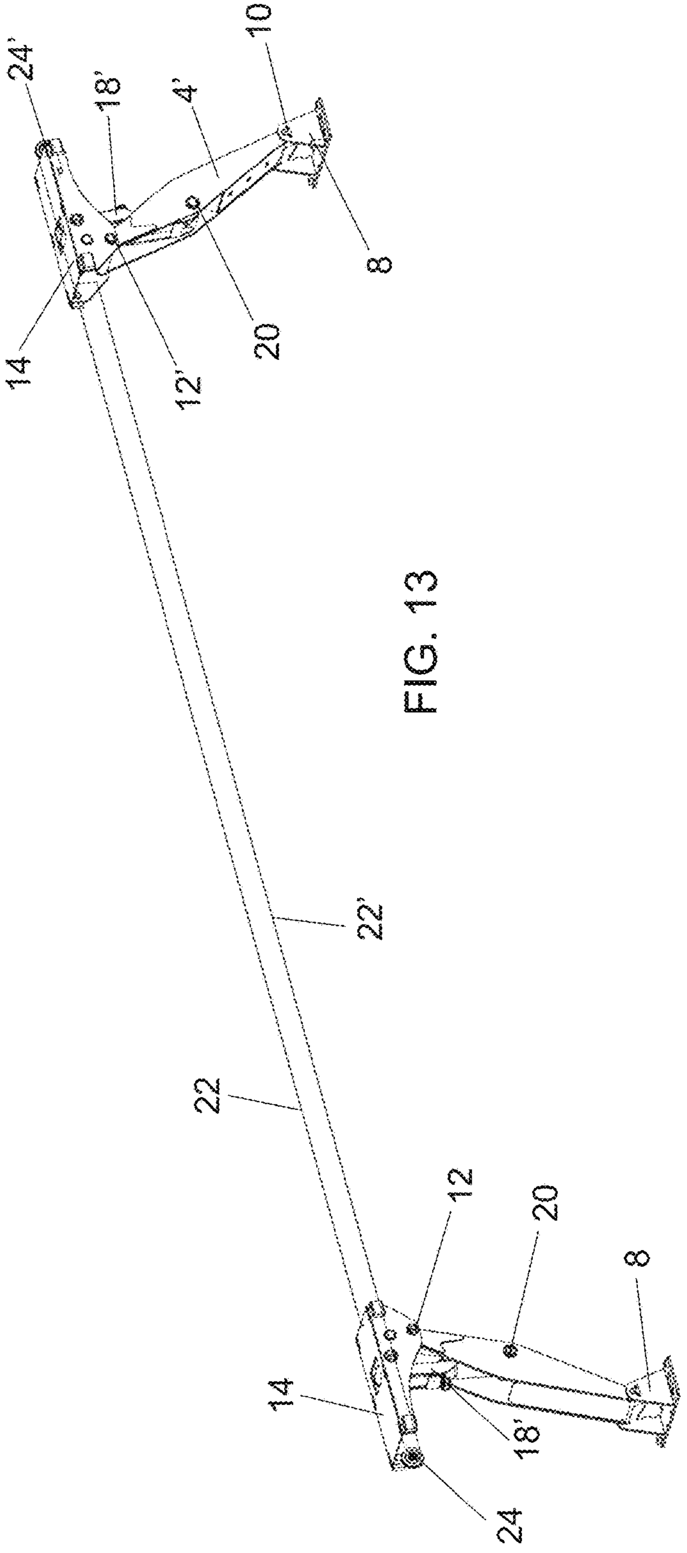
FIG. 13 shows it in the same view as FIG. 4 in an eighth embodiment.
Figure 14:
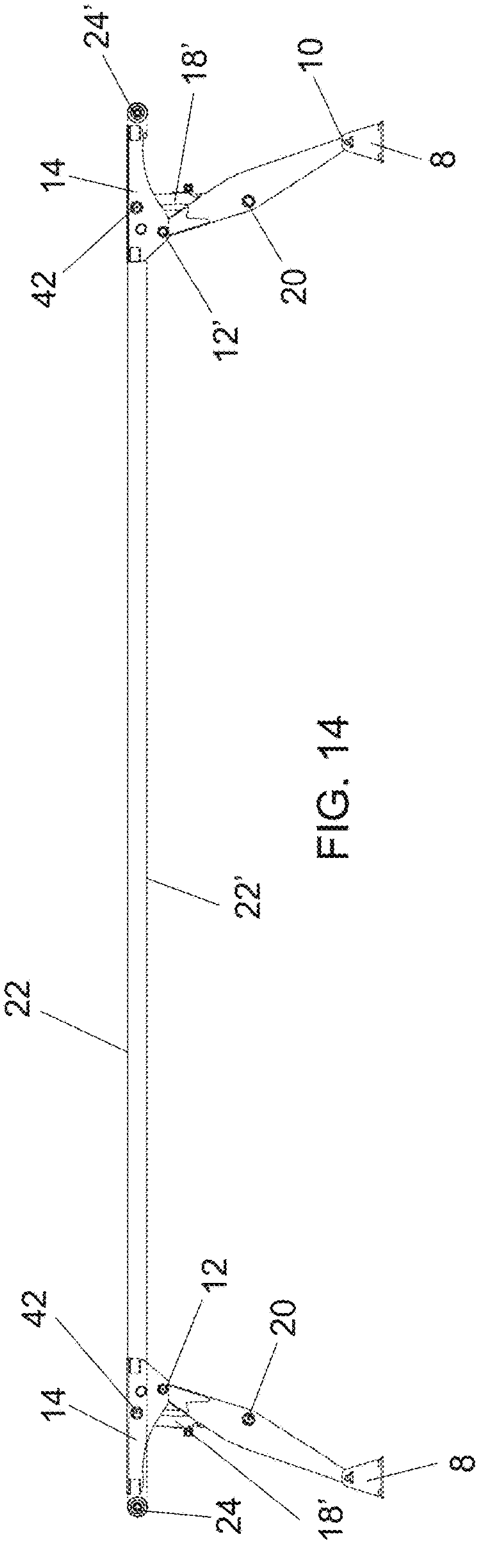
FIG. 14 shows it in a side view in this eighth embodiment.

An eighth embodiment illustrated in FIG. 13 differs from all the previous embodiments described previously in having the actuators 18' interposed between the legs 4,4' and the trolleys 14 sliding along the lanes 2. In this case the trolleys 14, to which the upper end of the legs 4,4' is articulated, have a greater longitudinal development compared to the trolleys 14 of the previous embodiments, since the upper end of the actuators 18' must also be able to be articulated to them in correspondence of articulation axes 42 distinct from the axles 12,12' of articulation of the legs 4,4' to the trolleys themselves.

The connections between the two carriages 14' in order to obtain coordination in their movements can be carried out with any of the methods described for the previous embodiments, without the need to describe them again. Furthermore, even if this embodiment provides that the upper ends of the two legs 4,4' are closer to each other than their lower ends, the invention also includes embodiments with the actuators 18' arranged above, i.e. between the lanes 2 and the legs 4,4', but with the lower ends closer together than the rear ends.

All the embodiments with the actuators 18' arranged above, in addition to presenting all the advantages that the other embodiments also present compared to the state of the art, present the further advantage of having all the components of the lift, which for different reasons can be considered critical, namely the actuators, the mechanical safety devices, the electrical and electronic control devices, which are generally associated with the actuators, and the connections between these and the power and control units, located in the upper part of the lift and this means that during use of the lift they are kept distanced from the floor and are thus more protected from dirt (polluting materials, washing liquids, etc.) which are generally mainly present on the floor or near this.

In a further embodiment, not illustrated in the drawings, the lift according to the invention comprises a single lane, two legs associated with it and a plurality of crosspieces applied to the lane and configured to support and lift a motor vehicle. Since in this single lane lift on the one hand the legs are connected to each other in one of the shapes already described and on the other hand the configuration of the single lane and the crosspieces applicable to it are in themselves traditional, a more in-depth description of this embodiment appears superfluous.

The invention claimed is:

1. A lift comprising:

at least one lane, two legs articulated to said at least one lane, each leg comprised of a single arm, at least one actuator associated with each leg and configured to vary an inclination of the legs with respect to the horizontal plane and to lift and lower said at least one lane, and a synchronized control unit of the at least one actuator wherein the two legs articulated to said at least one lane are arranged symmetrically with respect to a transversal median plane of the lift, a lower end of each leg is articulated to a base for anchoring to a floor in correspondence with a fixed transverse articulation axis, an upper end of each leg is articulated to the at least one lane in correspondence with a transverse articulation axis to a carriage sliding along the at least one lane, the carriage, to which the upper end of each leg is articulated, is connected by a pair of flexible traction elements, each flexible traction element of which is connected by ends thereof to a respective carriage and is returned by a respective transmission member mounted idly on said at least one lane, defining a closed loop configuration, thereby causing, following a variation in the inclination of said legs, a longitudinal translation of said at least one lane towards the leg that is less inclined with respect to the horizontal.

2. The lift according to claim 1, wherein in a lowered lift configuration, the articulation axis of the lower end of each leg at the relative base is placed at a higher level than the axis of articulation of the upper end of the leg to the relative carriage.

3. The lift according to claim 1, wherein said at least one actuator is placed between each leg and the leg's respective base.

4. The lift according to claim 1, wherein said at least one actuator is placed between each leg and the carriage sliding along the respective lane.

5. The lift according to claim 3, wherein in a lowered lift configuration an articulation axis of each actuator to the relevant leg is placed at a level not lower than an axis of articulation of the actuator to the respective base.

6. The lift according to claim 1, wherein in a lowered lift configuration said at least one lane houses within it the respective legs, the actuators associated with the legs and the bases, to which said legs are articulated.

7. The lift according to claim 1, wherein each flexible traction element further comprises deviation members mounted on the respective lane and arranged so as to ensure parallelism with the same of at least a straight section of flexible traction element running from a deviation member to a carriage.

8. The lift according to claim 7, wherein said flexible traction elements are selected from the group consisting of: cables, ropes, belts and chains, and wherein said transmission members and said deviation members are configured to be coupled with said flexible traction elements.

9. The lift according to claim 7, wherein each transmission member and/or each deviation member is mounted on a respective at least one lane with the interposition of elastic yielding means checked.

10. The lift according to claim 9, wherein each transmission member and/or each deviation member is mounted on a pin sliding along said lane and is associated to pre-loaded elastic means that keeps said pin in a correct working position.

11. The lift according to claim 1, wherein said flexible traction elements belong to a single flexible element closed in a ring and highlighting parallel rectilinear sections, to each of which is tied to a carriage.

12. The lift according to claim 1, further comprising further trolleys sliding along said at least one lane in the space delimited by the trolleys, to which said legs are articulated and also comprising rigid rods connecting each carriage to a respective further trolley, to which one end of said flexible traction elements is fixed after having been sent by respective vertical axis transmission members fixed to said lane in an intermediate position between each first carriage and the corresponding further carriage.

13. The lift according to claim 12 wherein said rigid rods run within corresponding longitudinal channels obtained in said at least one lane.

14. The lift according to claim 1, wherein the distance between the articulation axes of the legs to the respective bases is less than the distance between the articulation axes of the legs to the respective at least one lane in any lifting condition of the lift.

15. The lift according to claim 1, wherein the distance between the articulation axes of the legs at the respective bases is greater than the distance between the axes of articulation of the legs to the respective at least one lane in any lifting condition of the lift.

16. The lift according to claim 1, wherein the ratio between the maximum lifting stroke of said at least one lane, measured with reference to the articulation axes of said at least one lane to said legs, and the length of said legs, measured between their axes of articulation to said at least one lane and their axes of articulation to said bases, is not less than unity.

17. The lift according to claim 1, wherein the at least one lane is a pair of lanes, each lane being supported by two legs.

18. The lift according to claim 17, wherein each lane is configured so as to highlight at least in correspondence with an internal longitudinal edge thereof, a continuous longitudinal step for supporting internal crosspieces.

19. The lift according to claim 1, wherein the at least one lane is a single lane, and wherein a plurality of crosspieces are applied to the lane, the crosspieces projecting laterally from both sides of the lane and wherein the cross pieces are configured to support a motor vehicle.

* * * * *